US012552018B2

(12) United States Patent
Nott et al.

(10) Patent No.: US 12,552,018 B2
(45) Date of Patent: *Feb. 17, 2026

(54) INTEGRATING ROBOTIC PROCESS AUTOMATIONS INTO OPERATING AND SOFTWARE SYSTEMS

(71) Applicant: UiPath, Inc., New York, NY (US)

(72) Inventors: Brandon Nott, Bellevue, WA (US); Florin-Radu Tapus, Bucharest (RO)

(73) Assignee: UiPath, Inc., New York, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/130,050

(22) Filed: Apr. 3, 2023

(65) Prior Publication Data
US 2023/0234219 A1   Jul. 27, 2023

Related U.S. Application Data

(63) Continuation of application No. 17/214,344, filed on Mar. 26, 2021, now Pat. No. 11,618,160.

(51) Int. Cl.
*B25J 9/16* (2006.01)
*G05B 19/4155* (2006.01)
(Continued)

(52) U.S. Cl.
CPC .......... *B25J 9/161* (2013.01); *G05B 19/4155* (2013.01); *G06F 3/04817* (2013.01); *G06F 3/0482* (2013.01); *G05B 2219/40099* (2013.01)

(58) Field of Classification Search
CPC ................. B25J 9/161; G05B 19/4155; G05B 2219/40099; G06F 3/04817; G06F 3/0482; G06F 3/0481; G06F 2203/04803
(Continued)

(56) References Cited

U.S. PATENT DOCUMENTS 5,841,959 A * 11/1998 Guiremand ........ G01N 35/0092
6,357,038 B1    3/2002 Scouten
(Continued)

FOREIGN PATENT DOCUMENTS

CN    109829035 A    5/2019
CN    111241100 A    6/2020
(Continued)

OTHER PUBLICATIONS

Machine Translation of KR-20110070508-A1; Robot Programming System Based Graphic and Computer-Readable Storage Medium (Year: 2011).*
(Continued)

*Primary Examiner* — Ramon A. Mercado
*Assistant Examiner* — Ellis B. Ramirez
(74) *Attorney, Agent, or Firm* — Volpe Koenig

(57) ABSTRACT

Disclosed herein is a computing system that includes a memory and a processor coupled to the memory. The memory storing processor executable instructions for an interface engine that integrates robotic processes into a graphic user interface of the computing system. The processor executes the interface engine to cause the computing device to receive inputs via a menu of the graphic user interface and to automatically determine the robotic processes for display in response to the inputs. The interface engine further generates a list including selectable links corresponding to the robotic processes and displays the list in association with the menu.

20 Claims, 6 Drawing Sheets

(51) Int. Cl.
*G06F 3/04817* (2022.01)
*G06F 3/0482* (2013.01)

(58) Field of Classification Search
USPC .... 700/245, 264, 86, 83; 715/763, 810, 835, 715/846, 967; 901/3
See application file for complete search history.

(56) References Cited

U.S. PATENT DOCUMENTS

| | | | |
|---|---|---|---|
| 10,339,027 | B2 | 7/2019 | Garcia et al. |
| 10,654,166 | B1 * | 5/2020 | Hall .................. G05B 19/0426 |
| 10,908,950 | B1 | 2/2021 | Dennis et al. |
| 2007/0150102 | A1 * | 6/2007 | Park .......................... G06F 8/34 |
| 2009/0222767 | A1 | 9/2009 | Matthews et al. |
| 2010/0205559 | A1 * | 8/2010 | Rose ..................... G06F 3/0482 |
| 2012/0084644 | A1 * | 4/2012 | Robert ................. G06F 16/168 |
| 2013/0024815 | A1 | 1/2013 | O |
| 2013/0038636 | A1 * | 2/2013 | Fujiwaka ............ G06F 3/04883 |
| 2014/0371912 | A1 * | 12/2014 | Passot .................... G06N 3/049 |
| 2016/0282862 | A1 * | 9/2016 | Duffley ................ G05D 1/0274 |
| 2017/0001308 | A1 | 1/2017 | Bataller et al. |
| 2017/0052824 | A1 | 2/2017 | Sharma et al. |
| 2018/0074931 | A1 | 3/2018 | Garcia et al. |
| 2019/0286474 | A1 | 9/2019 | Sturtivant |
| 2020/0230817 | A1 * | 7/2020 | Han ....................... B25J 9/1661 |

FOREIGN PATENT DOCUMENTS

| | | |
|---|---|---|
| CN | 111723270 A | 9/2020 |
| KR | 20110070508 A * | 6/2011 |

OTHER PUBLICATIONS

Ionescu, T. B. "Leveraging Graphical User Interface Automation for Generic Robot Programming. Robotics 2021, 10, 3." (Year: 2021).*
International Search Report and Written Opinion; PCT/US2021/056780; Feb. 14, 2022; pp. 1-10.
Fastkeys Software, "Start Menu," available at https://fastkeysautomation.com/documentation5/StartMenu.html.

* cited by examiner

INTEGRATING ROBOTIC PROCESS AUTOMATIONS INTO OPERATING AND SOFTWARE SYSTEMS

CROSS-REFERENCE TO RELATED APPLICATIONS

This application is a Continuation of U.S. application Ser. No. 17/214,344, filed on Mar. 26, 2021, which is incorporated herein by reference in its entirety.

BACKGROUND

The disclosure herein relates to the field of robotic process automation (RPA), and particularly to integrating RPAs into operating and software systems.

Conventional operating and software systems can include a start menu and search bar to find and select applications, files, documents, and recent activities. Yet, this start menu and search bar at present have no way of providing an automation experience, along with no way of implementing an automation process pinning for easy and quick access to the automation experience. Thus, there is a need to integrate automation with start menus and search bars to provide automation experience to the users.

SUMMARY

According to one or more embodiments, a computing system is provided. The computing system includes a memory and a processor coupled to the memory. The memory storing processor executable instructions for an interface engine that integrates robotic processes into a graphic user interface of the computing system. The processor executes the interface engine to cause the computing device to receive inputs via a menu of the graphic user interface and to automatically determine the robotic processes for display in response to the inputs. The interface engine further generates a list including selectable links corresponding to the robotic processes and displays the list in association with the menu.

According to one or more embodiments, the computing system embodiment above can be implemented as a method, an apparatus, a device, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

Figure 5:
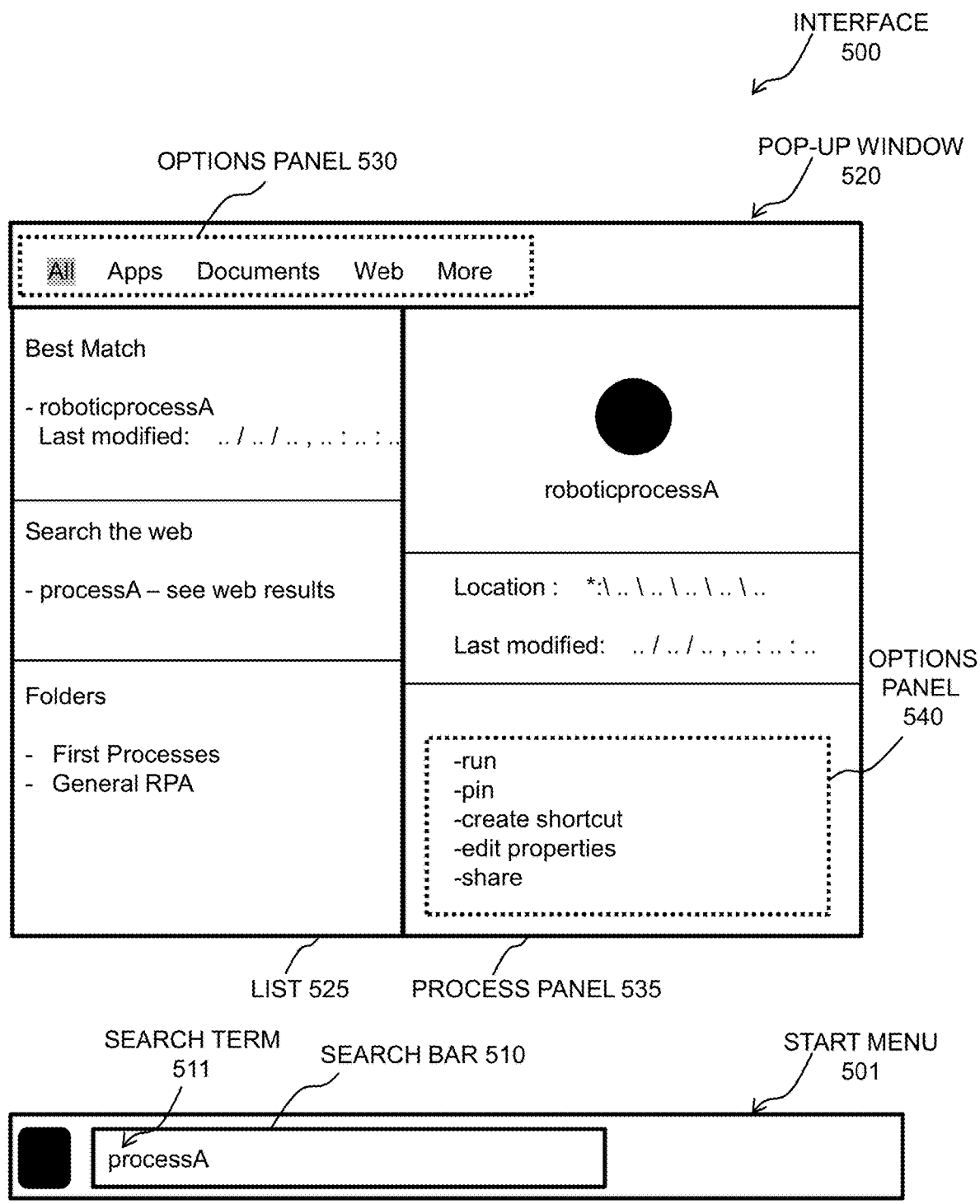

FIG. 5 a user interface is shown according to one or more embodiments; and

Figure 6:
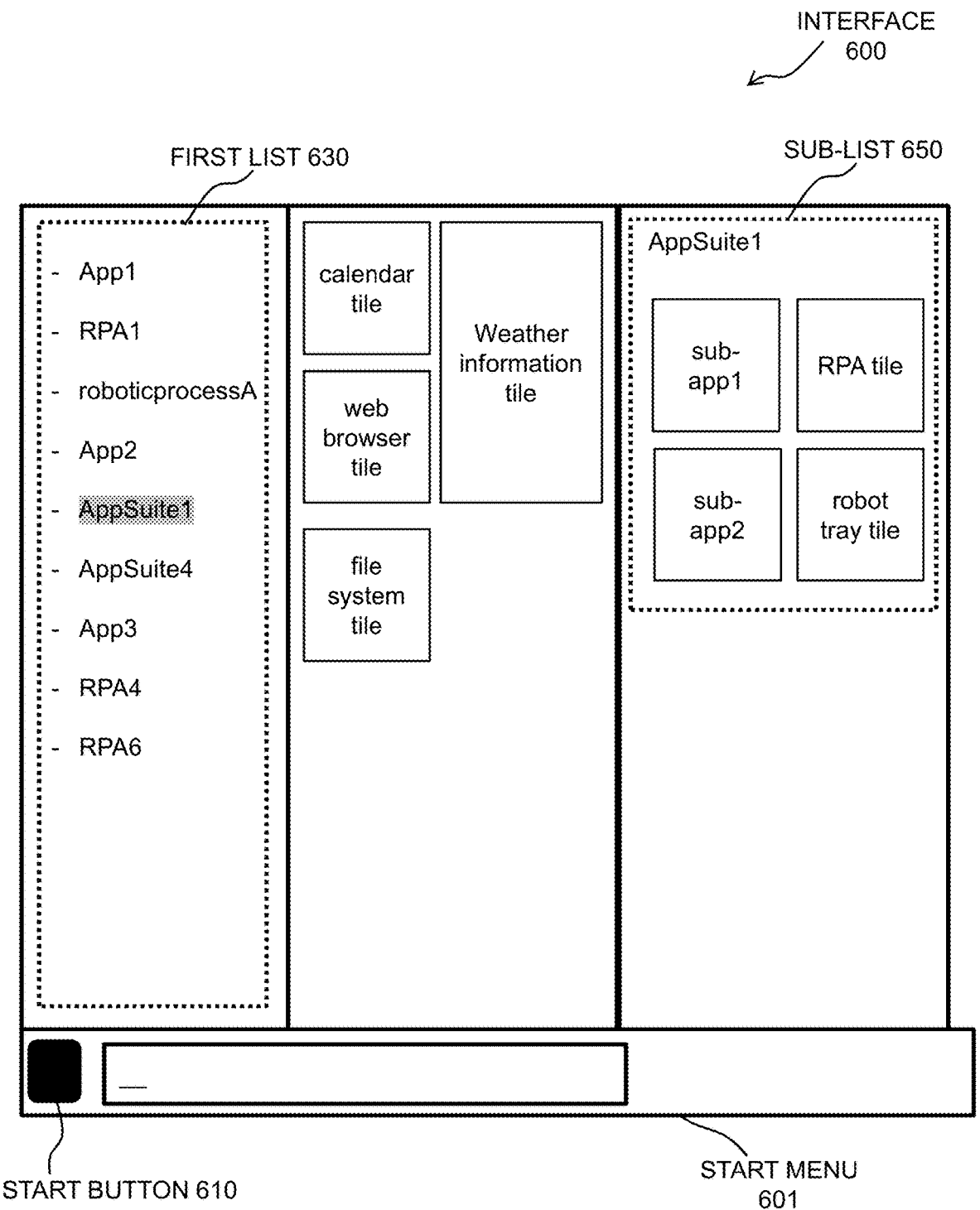

FIG. 6 a user interface is shown according to one or more embodiments.

DETAILED DESCRIPTION

Disclosed herein is an interface engine according to one or more embodiments. The interface engine includes software and/or hardware that integrates RPAs into operating and software systems. More particularly, the interface engine integrates RPAs and native RPA search capabilities into start menus and search bars to achieve an automation experience at a graphic user interface (GUI) level for any operating or software system. The interface engine can be implemented in a computing system through a combination of hardware and software (e.g., processor executable code that is necessarily rooted in the hardware). The interface engine, when implemented, can provide a specific configuring and tooling robotic process automation method for improved RPA access techniques that manipulates input data, input fields, menus, robotic processes, list, links, and the like, along with respective programming, with respect to GUIs of the computing system.

In an example implementation, an embodiment of the configuring and tooling robotic process automation method by the interface engine includes receiving inputs via a menu of the graphic user interface and to automatically determining the robotic processes for display in response to the inputs. The interface engine further generates a list including selectable links corresponding to the robotic processes and displays the list in association with the menu. Thus, the configuring and tooling robotic process automation method of the interface engine involves a multi-step data manipulation of robotic processes, interface components, data, and configurations in connection with the computing system.

As an operational example according to one or more embodiments, the interface engine integrates RPA with native search capabilities of an operating system such that an RPA icon, shortcut, and/or list appears in a start menu or a search bar thereof. The RPA icon, shortcut, and/or list can be considered a pin of an automation experience or process for easy access to automation. Whenever a user selects the start menu, the user can further select the pin to find all applications, files, documents, and/or recent activities with respect to RPAs. In some cases, the pin provides an option to directly initiate an automated process from the start menu. Similarly, whenever a user performs a search for a word/term/phrase in the search bar, a pop-up frame shows folders, documents, and best matches respective to RPAs related to the searched word. In some cases, the pop-up frame includes one or more sections, one of which provides a list of automated processes related to the word/term/phrase.

According to one or more technical effects, advantages, and benefits, the interface engine provides an automation experience to users, along with implementing an automation process pinning for easy and quick access to the automation experience, via the integration detailed herein.

Figure 1:
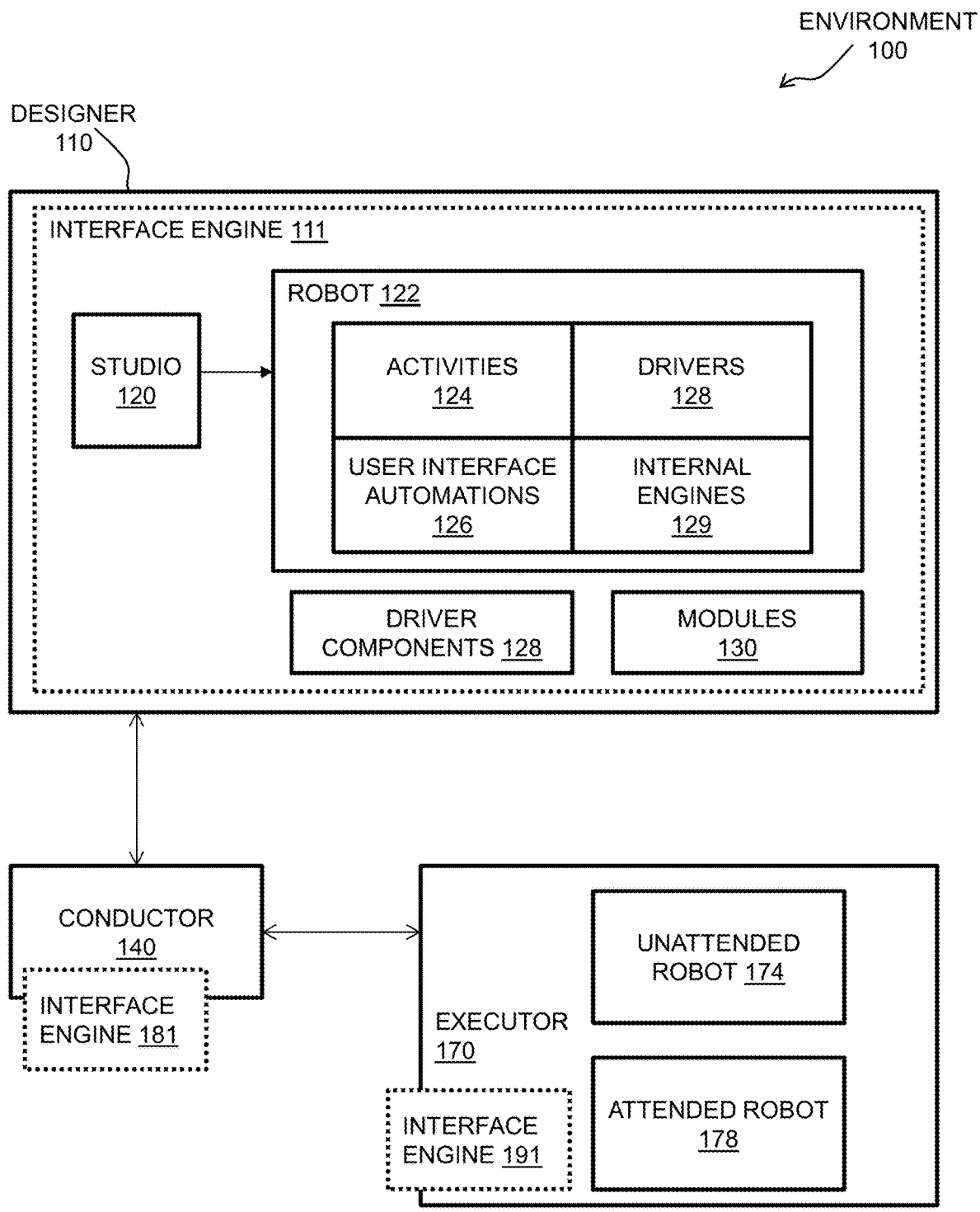
FIG. 1 depicts an environment illustrating development, design, operation, and/or execution of robotic process automations (RPAs) according to one or more embodiments.

FIG. 1 depicts an environment 100 illustrating development, design, operation, and/or execution of robotic process automations (RPAs) according to one or more embodiments. The environment 100 can be a design and deployment computing platform that includes one or more components. Note that while a single block is shown for each of the one or more components of the environment 100, that single block is representative of one or more of that component.

As shown, the environment 100 can include a designer 110 that further includes an interface engine 111. The interface engine 111 can include a studio component or module 120 that produces one or more robots (e.g., a robot 122) that perform one or more activities 124 and/or provide one or more user interface (UI) automations 126 using one or more driver components 128 and/or internal engines 129. The robot 122 may also engage with other driver components 131 and modules 132 within the designer 110 as well. Further, the environment 100 can include a conductor 140 and an executor 170, which can download/acquire/transmit the robot 122 so that the robot 122 can be provided in the environment 100 as an unattended robot 174 and an attended robot 178 of the executor 170.

The designer 110, the conductor 140, and the executor 170 are representative of computing devices, computing apparatuses, and/or computing systems, which comprise hardware, software, or a combination thereof. The designer 110, the conductor 140, and the executor 170, and any software thereon (e.g., the interface engine 111) are configured to interact with a user or an operator so as to receive inputs and provide outputs. In an example, the executor 170 can be or implement mobile computing and/or mobile device environments.

According to one or more embodiments, the designer 110 can be referred to as a studio platform, a development platform, and/or an online platform. The designer 110 can include one or more engines (e.g., the interface engine 111), development environments (e.g., the studio 120), or the like and can be configured to generate code, instructions, commands, or the like for a robot (e.g., the one or more robots 122, the unattended robots 174, and the attended robots 178) to perform or automate one or more workflows (e.g., the one or more activities 124 and/or provide the one or more UI automations 126).

The interface engine 111, generally, is software and/or hardware that implements robotic process automation. In this regard, the interface engine 111 is detailed as a dotted box to illustrate a scalability and a portability of the interface engine 111 within the environment 100. For example, the interface engine 111 can be implemented as separate instances throughout the environment 100, as shown by the interface engines 181 and 191.

Further, in accordance with one or more embodiments, the interface engine 111 can be part of a framework/mechanism (e.g., the environment 100) that automatically implements codes and designs the robot 122 within the studio 120. The interface engine 111 can also enable developers and/or orchestrators (e.g., a user or operator) to code, program, and/or design the robot 122, such as through the studio 120. In an embodiment, the studio 120 can provide application integration, along with automating of third-party applications, administrative information technology (IT) tasks, and/or business IT processes.

The robot 122 (and the unattended robots 174 and the attended robots 178) may be an application, applet, script, or the like that may perform and/or automate one or more workflows (e.g., represented in part by the one or more activities 124 and/or provide the one or more UI automations 126). A workflow may include, but are not limited to, task sequences, flowcharts, Finite State Machines (FSMs), global exception handlers, UI transparents, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, filling a form, information technology (IT) management, or the like. To run a workflow for UI automation, the robot 122 may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

According to one or more embodiments, at development, the robot 122 can be produced at/by the designer 110 (e.g., the studio 120) and stored therein. Further, at deployment, the robot 122 may be managed, controlled, configured or the like at/by the conductor 140 (e.g., within the interface engine 181). At deployment, the robot 122 may also be executed within the executor 170. In an example, a user input (e.g., a selection on a display) can be submitted by a user or an operator to the designer 110. From the selection, which the designer 110 may provide to the robot 122, the robot 122 may determine representative data of area(s) of a visual display (e.g., selected by the user or the operator). As part of RPAs, shapes (e.g., squares, rectangles, circles, polygons, freeform, or the like) in multiple dimensions may be utilized for UI robot development and runtime in relation to a computer vision (CV) operation and/or a machine learning (ML) model.

According to one or more embodiments, UI automations 126 may be performed by the robot 122 using the drivers 128 therein, and the interface engine 111 can perform activities using the modules 130 (e.g., CV activities module or engine). The driver components 132 may be utilized for UI automation by the robot 122 to get elements of a UI. The driver components 132 may include, but are not limited to, OS drivers, browser drivers, virtual machine drivers, enterprise drivers, and the like. In certain configurations, the modules 130 may be a driver used for UI automation. Further, any of these actions by the robot 122 can be implemented on a client (e.g., as the unattended robots 174 and the attended robots 178 of the executor 170). Note further that a plurality of the robots 122 can be stored on and can be searchable within the designer 110, the conductor 140, and the executor 170.

The conductor 140 may instruct or command the robots 122, 174, and 178 or the executor 170 to execute or monitor a workflow in a mainframe, web, virtual machine, remote machine, virtual desktop, enterprise platform, online platform, desktop app(s), browser, or the like client, application, or program. The conductor 140 may act as a central or semi-central point to instruct or command one or more robots (e.g., the robots 122, 174, and 178) to automate a computing platform (e.g., the environment 100).

In accordance with one or more embodiments, the conductor 140 may be configured for provisioning, deployment, configuration, queueing, monitoring, logging, and/or providing interconnectivity. Provisioning may include creating and maintenance of connections or communication between the one or more robots, the executor 170, and conductor 140.

Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). The conductor 140 may provide interconnectivity by acting as the centralized point of communication for third-party solutions and/or applications.

According to one or more embodiments, the one or more robots and the executor 170 may be configured as the unattended robot 174 and/or the attended robot 178. For unattended operations, automation by the unattended robot 174 may be performed without third party inputs or control. For attended operations, automation by the attended robot 178 may be performed by receiving input, commands, instructions, guidance, or the like from a third party component. The unattended robot 174 and/or the attended robot 178 may run or execute on mobile computing or mobile device environments.

According to one or more embodiments, the one or more robots and the executor 170 may be configured as execution agents that run workflows built in the designer 110. A commercial example of a robot(s) for UI or software automation is UiPath Robots™. In some embodiments, the one or more robots and the executor 170 may install the Microsoft Windows® Service Control Manager (SCM)-managed service by default. As a result, such robots can open interactive Windows® sessions under the local system account, and have the rights of a Windows® service.

According to one or more embodiments, the one or more robots and the executor 170 may be installed in a user mode. For example, the one or more robots may have the same rights as a user under which a given robot is installed. This feature may also be available for High Density (HD) robots, which ensure full utilization of each machine at maximum performance such as in an HD environment.

According to one or more embodiments, the one or more robots and the executor 170 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between the conductor 140 and execution hosts (i.e., the computing systems on which the one or more robots are executed). These services may be trusted with and manage the credentials for the one or more robots and the executor 170. User mode robot services may manage and monitor Windows® sessions and act as a proxy between conductor 140 and the execution hosts. User mode robot services may be trusted with and manage the credentials for robots. A Windows® application may automatically be launched if the SCM-managed robot service is not installed. In an example, the executor 170 may run given jobs under a Windows® session (e.g., they may execute workflows described herein) and may be aware of per-monitor dots per inch (DPI) settings. Agents may be Windows® Presentation Foundation (WPF) applications that display available jobs in a system tray window. Agents may be a client of the service. Agents may request to start or stop jobs and change settings. The command line may be a client of the service. The command line is a console application that can request to start jobs and waits for their output.

According to one or more embodiments, configurations where components of the one or more robots and/or the executor 170 are split helps developers, support users, and computing systems more easily run, identify, and track execution by each component. Special behaviors may be configured per component this way, such as setting up different firewall rules for the executor 170 and a service. The executor 170 may be aware of DPI settings per monitor in some embodiments. As a result, workflows may be executed at any DPI, regardless of the configuration of the computing system on which they were created. Projects from the designer 110 may also be independent of browser zoom level. For applications that are DPI-unaware or intentionally marked as unaware, DPI may be disabled in some embodiments.

Figure 2:
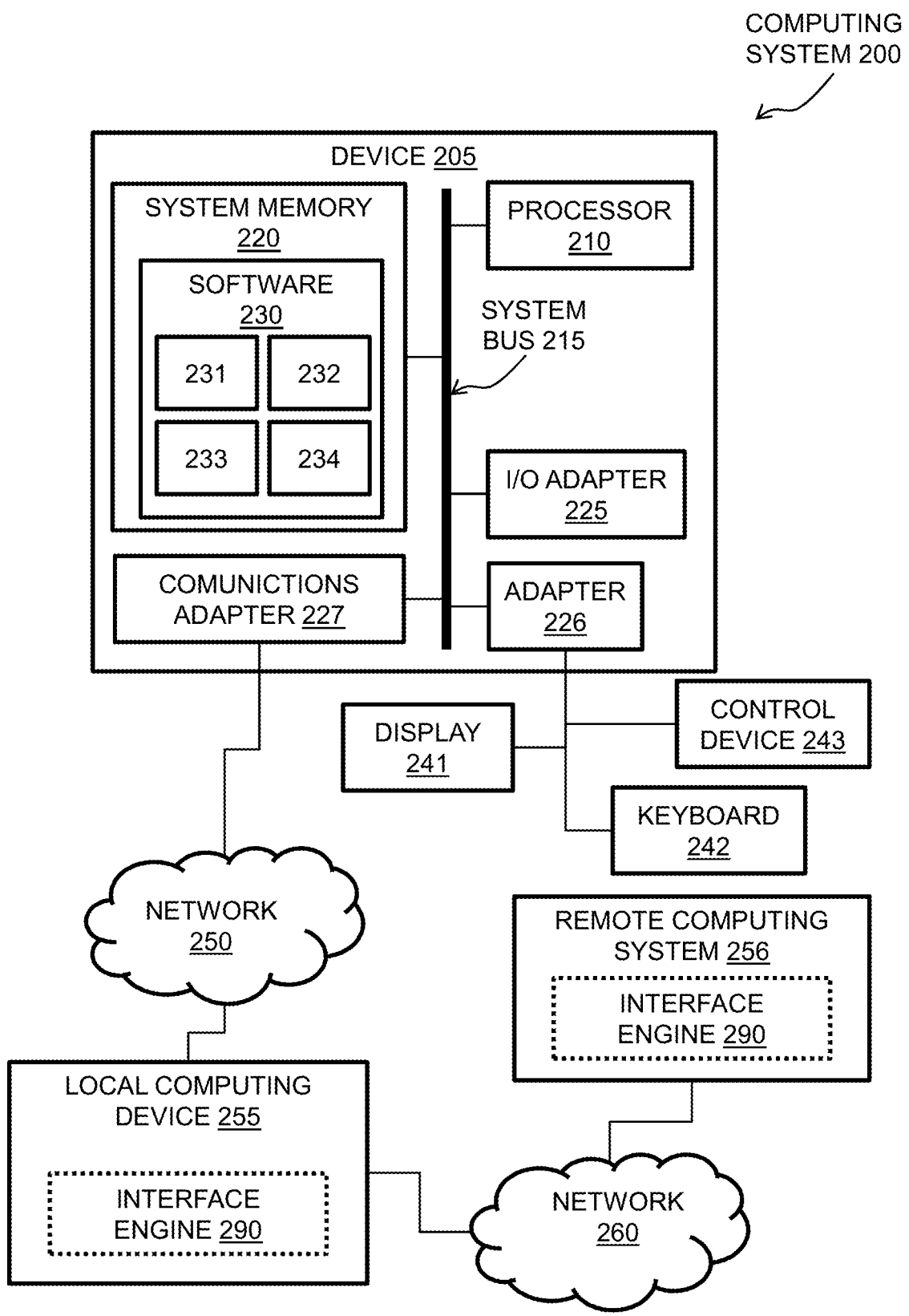
FIG. 2 is an illustration of a computing system according to one or more embodiments.

Turning now to FIG. 2, a computing system 200 is illustrated according to one or more embodiments. The computing system 200 can be representative of any computing device, computing apparatus, and/or computing environment, which comprise hardware, software, or a combination thereof (e.g., hardware supporting the interface engine 111 of FIG. 1). Further, embodiments of the computing system 200 disclosed may include apparatuses, systems, methods, and/or computer program products at any possible technical detail level of integration.

The computing system 200 has a device 205 (e.g., the designer 110, the conductor 140, and the executor 170 of FIG. 1) with one or more central processing units (CPU(s)), which are collectively or generically referred to as a processor 210. The processor 210, also referred to as processing circuits, is coupled via a system bus 215 to a system memory 220 and various other components. The computing system 200 and/or the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured. In addition, at least the processor 210 may be a neuromorphic circuit that includes processing elements that mimic biological neurons.

The bus 215 (or other communication mechanism) is configured for communicating information or data to the processor 210, the system memory 220, and various other components, such as the adapters 225, 226, and 227.

Figure 3:
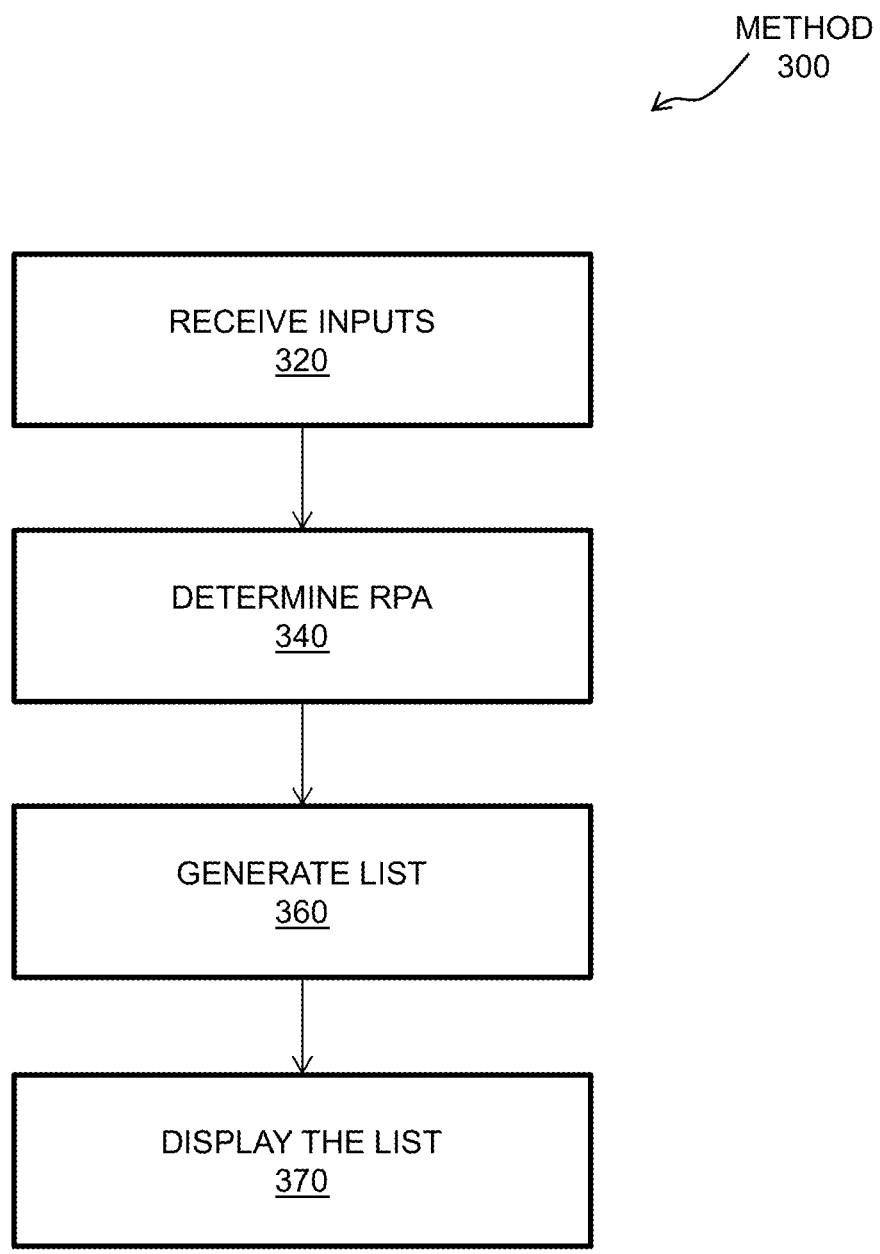
FIG. 3 is a block diagram illustrating a process flow executed by one or more processors within an interface engine according to one or more embodiments.
Figure 4:
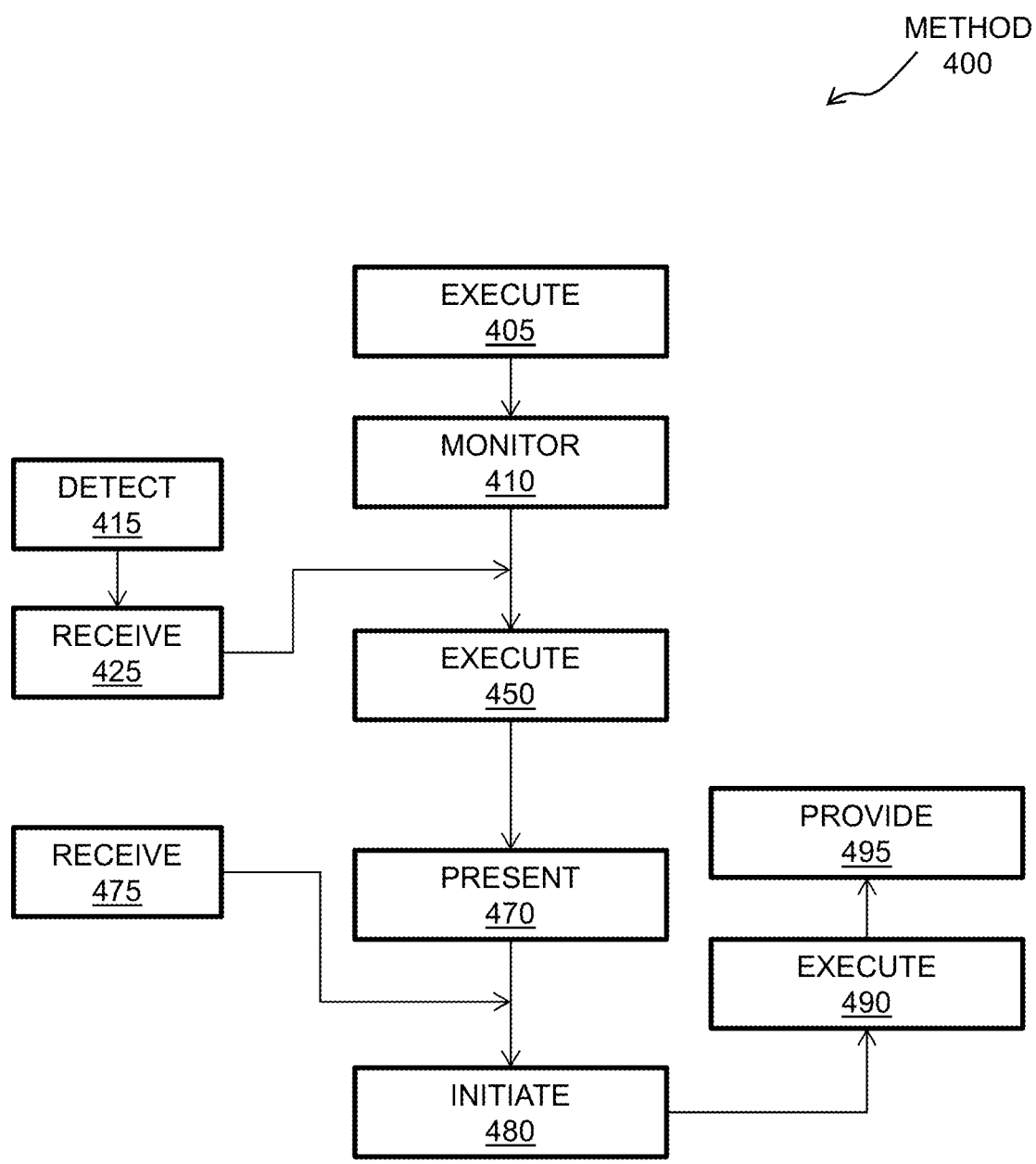
FIG. 4 is a block diagram illustrating a process flow executed by one or more processors within an interface engine according to one or more embodiments.

The system memory 220 is an example of a (non-transitory) computer readable storage medium, where software 230 can be stored as software components, modules, engines, instructions, or the like for execution by the processor 210 to cause the device 205 to operate, such as described herein with reference to FIGS. 3-4. The system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processors 210. Non-transitory computer readable storage mediums can include any media that is removable, non-removable, or the like.

In connection with FIG. 1, the software 230 of FIG. 2 can be representative of interface engine 111 and components therein, such that the memory 220 and the processor 210 can logically design/configure/provide the robot 122, which further performs one or more activities 124 and/or provides one or more UI automations 126 using one or more driver components 128 and/or internal engines 129. The software 230 of FIG. 2 can also be representative of an OS for the device 205 for the computing system 200.

According to one or more embodiments, the software 230 can be configured in hardware, software, or a hybrid implementation. The software 230 can be composed of modules that are in operative communication with one another, and to pass information or instructions. The software 230 can further include custom modules to perform application specific processes or derivatives thereof, such that the computing system 200 may include additional functionality. For example, according to one or more embodiments, the software 230 may be configured to store information, instructions, commands, or data to be executed or processed by the processor 210 to enable operations 231, 232, 233, and 234.

For instance, the interface engine 111 of FIG. 1 implemented as the software 230 of FIG. 2 can provide a specific configuring and tooling robotic process automation method to the computing system 200, so that the computing system 200 can receive (231) one or more inputs via an input field of a menu, determine (232) one or more robotic processes that relate to the one or more inputs, and display (233) a list including one or more selectable links corresponding to the one or more robotic processes (e.g., the list being displayed in association with the menu). Note that a selection of any of the one or more selectable links can initiate (234) a corresponding automated process of the one or more robotic processes.

Further, modules of the software 230 can be implemented as a hardware circuit comprising custom very large scale integration (VLSI) circuits or gate arrays, off-the-shelf semiconductors such as logic chips, transistors, or other discrete components, in programmable hardware devices (e.g., field programmable gate arrays, programmable array logic, programmable logic devices), graphics processing units, or the like. Modules of the software 230 can be at least partially implemented in software for execution by various types of processors. According to one or more embodiments, an identified unit of executable code may include one or more physical or logical blocks of computer instructions that may, for instance, be organized as an object, procedure, routine, subroutine, or function. Executables of an identified module co-located or stored in different locations such that, when joined logically together, comprise the module. A module of executable code may be a single instruction, one or more data structures, one or more data sets, a plurality of instructions, or the like distributed over several different code segments, among different programs, across several memory devices, or the like. Operational or functional data may be identified and illustrated herein within modules of the software 230, and may be embodied in a suitable form and organized within any suitable type of data structure.

With respect to the adapters 225, 226, and 227 of FIG. 2, the device 205 can particularly include an input/output (I/O) adapter 225, a device adapter 226, and a communications adapter 227. According to one or more embodiments, the I/O adapter 225 can be configured as a small computer system interface (SCSI), or in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication. The device adapter 226 interconnects input/output devices to the system bus 215, such as a display 241, a keyboard 242, a control device 243, or the like (e.g., a camera, a speaker, etc.). The communications adapter 226 interconnects the system bus 215 with a network 250, which may be an outside network, enabling the device 205 to communicate data with other such devices (e.g., such as the local computing device 255 and, further, the remote computing system 256 through the network 260). In one embodiment, the adapters 225, 226, and 227 may be connected to one or more I/O buses that are connected to the system bus 215 via an intermediate bus bridge. Suitable I/O buses for connecting peripheral devices such as hard disk controllers, network adapters, and graphics adapters typically include common protocols, such as the Peripheral Component Interconnect (PCI).

Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The keyboard 242 and the control device 243, such as a computer mouse, a touchpad, a touch screen, a keypad, or the like, may be further coupled to the system bus 215 for input to the device 205. In addition, one or more inputs may be provided to the computing system 200 remotely via another computing system (e.g., the local computing device 255 and/or the remote computing system 256) in communication therewith, or the device 205 may operate autonomously.

According to one or more embodiments, the functionality of the device 205 with respect to the software 230 can also be implemented on the local computing device 255 and/or the remote computing system 256, as represented by separate instances of the interface engine 290.

Turning now to FIG. 3, a block diagram illustrating a process flow 300 according to one or more embodiments. More particularly, the process flow 300 is example implementation of a specific configuring and tooling robotic process automation method for improved RPA access techniques that manipulates input data, input fields, menus, robotic processes, list, links, and the like, along with respective programming, with respect to GUIs. The process flow 300 can be considered an example implementation of the interface engine 111 of FIG. 1 and/or the software 230 of FIG. 2 executed by one or more processors (e.g., the processor 210). For ease of explanation, the process flow 300 is described with respect to the interface engine 111 of FIG. 1.

The process flow 300 begins at block 320, where the interface engine 111 receives one or more inputs. According to one or more embodiments, the one or more inputs can be received via a menu of a graphic user interface, such as by hovering or clicking a start menu button of the menu or by entering a search term in a search bar of the menu. The one or more inputs can include any value (such as an initialized variable or literal), any function, any user interaction (e.g., mouse click, cursor action, hover action), any word, any term, any phrase, and/or any instruction that identifies a selection or defines a condition/parameter/setting.

In example, the interface engine 111 is working with an OS to provide a GUI. The GUI includes a menu with one or more input fields. The menu can be a list of options or commands presented to a user through the GUI that can be navigated by the keyboard 242 or other control device 243. In an embodiment, the menu includes a start menu of an OS, and the one or more input fields includes a search bar of the start menu. Further, the one or more inputs are provided to the interface engine 111 through the one or more input fields of the menu within the GUI.

The one or more input fields are mechanisms or UI elements enabling a user to interact with the menu of the GUI. An example of the one or more input fields include text fields for providing one or more inputs using the keyboard 242. Other examples include option buttons, radio buttons, switch button, or similar a graphical control element.

At block 340, the interface engine 111 automatically determines one or more robotic processes for display in response to the one or more inputs. The one or more robotic processes are examples of the robot 122 as described herein. To determine the one or more robotic processes, the interface engine 111 executes a search operation (e.g., within the environment 100) based on the one or more inputs. The search operation can be a native search capability of the OS. For example, when a user operating the device 205 submits an input (e.g., the one or more inputs) to the software 230, the software 230 performs a search for the one or more robotic processes within the system memory 220 based on values and/or indexes associated therewith. As matches are discovered, a buffer can be populated of pointers to the one or more robotic processes.

At block 360, the interface engine 111 generates a list including one or more selectable links corresponding to the one or more robotic processes. The list provides quick access to the one or more robotic processes. At block 380, the interface engine 111 displays the list in association with the menu. The list can be displayed by a pop-up frame in association with the menu. According to one or more embodiments, the pop-up frame can be a pop-up window type where a new window opens and overlays the GUI without specific selection and by automation. The pop-up window type can be separate from the menu. According to one or more embodiments, the pop-up frame can also include one or more sections or sub-section, one of which provides the list.

According to one or more embodiments, the list can be displayed in the menu, such as in a section or sub-section. The sub-section of the menu can be an iteration of a pop-up frame within the menu itself. Further, according to one or more embodiments, the pop-up frame can also be a pop-up menu (e.g., extending from a start menu, search bar, or the like) type where the list automatically appears within or on top of the menu.

According to one or more embodiments, the list can include one or more selectable links corresponding to the one or more robotic processes (e.g., via being associated with the pointers). That is, each selectable link is a reference to a particular robotic process, that can be followed by clicking, tapping, or the like. Examples of the one or more selectable links include, but are not limited to, an RPA icon, shortcut, and/or hyperlinked text. Note that a selection of any of the one or more selectable links initiates a corresponding automated process of the one or more robotic processes. In some cases, the display of the list can be considered a pin of an automation experience or process for easy access to automation.

Turning now to FIGS. 4-6, operations of the interface engine 111 are described according to one or more embodiments. FIG. 4 shows a block diagram illustrating a process flow 400 according to one or more embodiments. More particularly, the process flow 400 is example implementation of the specific configuring and tooling robotic process automation method by the interface engine 111.

The process flow 400 is related to integration RPA to a GUI (e.g., a search bar and/or a start menu) of an operating system. The process flow 400 begins at block 405, where the interface engine 111 executes an initial background integration with the operating system. In this regard, the interface engine 111 automatically couples to the search bar and/or the start menu to one or more robots 122. In turn, the interface engine 111 can actively monitors (block 410) user activity within the operating system. With respect to the user activity, the interface engine can execute an automation process pinning, where at least one RPA icon or shortcut is automatically pinned to the GUI for ease of access by the user.

Thus, at block 415, the interface engine 111 detects a click by a mouse into the search bar. At block 425, the interface engine 111 receives an input through the search bar. The input can be the entry of a word to search for an automated process (e.g., one or more robots 122).

At block 450, the interface engine 111 executes an automatic determination (e.g., search operation) with respect to that word. For example, whenever a word search is received in the operating system search bar, a pop-up frame can appear to shows folders, documents, and best RPA matches related to the searched word. In addition to the other sections on the pop-up window, a sub-section can be configured to show a list of automated processes (e.g., one or more robots 122) related to the word. At block 470, the interface engine 111 presents a pop-up frame with respect to the determination of block 450. The pop-up frame at least displays a list to provide quick access to the one or more robotic processes.

Turning to FIG. 5, a user interface 500 is shown according to one or more embodiments. The user interface 500 includes a start menu 501 including a search bar 510 with a search term 511 therein. The user interface 500 includes a pop-up window 520 including a list 525, a category menu 530, and a process panel 535 with an options menu 540 therein. As shown, according to one or more embodiments, the list 525 can be displayed by the pop-up window 520 separate from the start menu 501.

In operation, the interface 500 shows a user searching, by the search term 511 (e.g., processA), to access specific automated process (e.g., roboticprocessA). Once the search term 511 is entered into the search bar 510, the pop-up window 520 is provided to display the list 525 and the process panel 535 (which present the best match from the list 525), along with information regarding how many runs occurred of the best match, a last run of the best match, and other metadata showing specific attributes of the process (e.g., who ran the best match). The category menu 530 provides a mechanism to visualize the related folders, documents, and automated processes by selecting one of the categories therein (e.g., as shown the 'All' category is selected). According to one or more embodiments, the pop-up window 520 can also include a "search the web" option that shows results of the interface engine 111 interacting with other systems, environments, and/or databases (e.g., a robot tray, an orchestrator software, an automation hub, a RPA marketplace, which parallel the web and along with another other partner systems). The options menu 540 provides at least one mechanism to interact with the automated process presented, such as run pin, create shortcut, edit properties, and share (e.g., the 'run' option enables a user to directly initiate roboticprocessA from the start menu 501). According to one or more technical effects, advantages, and benefits, the interface 500 integrates (e.g., more specifically, mirroring processes in the list 525) RPA into the start menu 501 to provide the user easy access to automation.

At block 475, the interface engine 111 receives an input within the pop-up frame that indicates a selection of an automated process from the list. For instance, a user can click on the icon of the roboticprocessA in the options panel 540 or from the list 525 in one of the sub-sections in the pop-up window 520.

At block 480, the interface engine 111 initiates an automated process (e.g., roboticprocessA) based on the input of block 475. In an example, the roboticprocessA automatically opens an application and automatically executes to perform user actions (e.g., mimic user actions) on a GUI of an application.

At block 490, the interface engine 111 executes an automation process pinning. The automation process pinning, in general, pins an icon corresponding to an automated process (e.g., roboticprocessA) in response to initiating/running the automated process. According to one or more embodiments, the interface engine 111 can track a number of times the automated process has been initiated against a threshold number of times. In this regard, the interface engine determines a frequency of use, and when the automated process is executed with enough frequency (e.g., based on the threshold), the automating pinning occurs. In an example, the threshold can be any integer selected from a range of 1-50, such as 5.

At block 495, the interface engine 111 provides the pin based on the automation process pinning within the GUI. Turning to FIG. 6, a user interface 600 is shown according to one or more embodiments. The user interface 600 can include a pop-up menu type where the list automatically appears within the pop-up menu type (e.g., first list 630). Thus, as shown, the interface 600 includes a start menu 601 with a start button 610 and a pop-up menu type with sub-sections including a first list 630 and a sub-list 650. The first list 630 visualizes automated processes and applications.

In operation, the interface 600 shows roboticprocessA automatically selects the start button 610 (in response to the use click). This selection causes the pop-up menu type to appear. The roboticprocessA then automatically selects the 'AppSuite1' to cause the sub-list 650 to appear. The roboticprocessA then automatically selects the RPA tile of the sub-list 650 to initiate and execute an automated process within the 'AppSuite1'.

According to one or more embodiments, the automation integration by the interface engine 111 can be extended to any application, such that menus and search bars of the applications show the RPA pins (e.g., generated by blocks 390 and 395 of FIG. 3). Further, according to one or more embodiments, the interface engine 111 can include a task miner to identify/record automatable tasks (e.g., action by a user within an operating system or an application). In an example, the task miner can record all the user interactions with a GUI of the operating system or the application and identify repetitive tasks. The task miner can then recommend to the user, via a pop-up frame, to automate the identified repetitive tasks. In another example, the task miner can be a customized task recording where the user can define when and where to start/end a recording (e.g., closing the books after the end of month).

According to one or more technical effects, advantages, and benefits, the interface engine 111 provides easy access for RPAs, automation shortcuts to the user from start menu and/or search bar, and customizable task recording.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y, X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one or more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing system comprising:
at least one memory configured to store processor executable instructions for an interface engine configured to integrate one or more robotic processes into a graphic user interface of the computing system; and
at least one processor operatively coupled to the at least one memory,
wherein the at least one processor is configured to execute the interface engine to cause the computing system to:
automatically determine for display a best match sub-set of robotic process automations of the one or more robotic processes to one or more inputs;
generate a list comprising one or more selectable links corresponding to the best match sub-set, each of the one or more selectable links comprising one or more pins of icons corresponding to a particular robotic automation of the best match sub-set and configured to initiate that particular robotic automation upon selection; and
display, in association with a menu of the graphic user interface, the list and at least a sub-list of the one or more pins of icons based on a selected one of the one or more selectable links.

2. The computing system of claim 1, wherein each of the one or more robotic processes are configured to perform or automate one or more workflows.

3. The computing system of claim 1, wherein the list and the sub-list are individually displayed in sub-section panels of the menu in response to receiving a word.

4. The computing system of claim 1, wherein the one or more inputs comprises at least a word received via the menu of the graphic user interface and the sub-set comprise best matches to at least the word of the one or more inputs.

5. The computing system of claim 1, wherein the one or more inputs comprise one or more of a value, a function, a user interaction, a word, a term, a phrase, and an instruction.

6. The computing system of claim 1, wherein the list is displayed in the menu.

7. The computing system of claim 1, wherein the menu comprises a start menu of an operating system, and the start menu comprises a search bar.

8. The computing system of claim 1, wherein the interface engine executes an automation process pinning of an additional pin to the sub-list based on a frequency of use of a robotic automation sub-process.

9. The computing system of claim 1, wherein the interface engine executes an automation process pinning of each pin in response to running the automated process more than a threshold number of times.

10. The computing system of claim 1, wherein the list is displayed in a pop-up frame that is separate from the menu.

11. A method implemented by an interface engine configured to integrate one or more robotic processes into a graphic user interface of a computing system comprising at least one memory storing processor executable instructions for the interface engine and at least one processor operatively coupled to the memory, the method comprising:
- automatically determining for display a best match sub-set of robotic process automations of the one or more robotic processes to one or more inputs;
- generating a list comprising one or more selectable links corresponding to the best match sub-set, each of the one or more selectable links comprising one or more pins of icons corresponding to a particular robotic automation of the best match sub-set and configured to initiate that particular robotic automation upon selection; and
- displaying, in association with a menu of the graphic user interface, the list and at least a sub-list of the one or more pins of icons based on a selected one of the one or more selectable links.

12. The method of claim 11, wherein each of the one or more robotic processes are configured to perform or automate one or more workflows.

13. The method of claim 11, wherein the list and the sub-list are individually displayed in sub-section panels of the menu in response to receiving a word.

14. The method of claim 11, wherein the one or more inputs comprises at least a word received via the menu of the graphic user interface and the sub-set comprise best matches to at least the word of the one or more inputs.

15. The method of claim 11, wherein the one or more inputs comprise one or more of a value, a function, a user interaction, a word, a term, a phrase, and an instruction.

16. The method of claim 11, wherein the list is displayed in the menu.

17. The method of claim 11, wherein the menu comprises a start menu of an operating system, and the start menu comprises a search bar.

18. The method of claim 11, wherein the interface engine executes an automation process pinning of an additional pin to the sub-list based on a frequency of use of a robotic automation sub-process.

19. The method of claim 11, wherein the interface engine executes an automation process pinning of each pin in response to running the automated process more than a threshold number of times.

20. The method of claim 11, wherein the list is displayed in a pop-up frame that is separate from the menu.

* * * * *